(12) United States Patent
Stolfus et al.

(10) Patent No.: US 10,444,034 B2
(45) Date of Patent: Oct. 15, 2019

(54) LINEAR ACTUATOR WITH POSITION INDICATOR

(71) Applicant: Honeywell International Inc., Morris Plains, NJ (US)

(72) Inventors: Joel Stolfus, Freeport, IL (US); Anthony J. Bussan, Davis Junction, IL (US); Kyle Vinnedge, Forreston, IL (US); Jeffrey Bouray, Freeport, IL (US)

(73) Assignee: Honeywell International Inc., Morris Plains, NJ (US)

( * ) Notice: Subject to any disclaimer, the term of this patent is extended or adjusted under 35 U.S.C. 154(b) by 622 days.

(21) Appl. No.: 15/139,537

(22) Filed: Apr. 27, 2016

(65) Prior Publication Data

US 2017/0317561 A1 Nov. 2, 2017

(51) Int. Cl.
*G01D 5/14* (2006.01)
*H02K 41/03* (2006.01)
*H02K 7/18* (2006.01)
*H02K 41/035* (2006.01)

(52) U.S. Cl.
CPC ........... *G01D 5/145* (2013.01); *H02K 7/1876* (2013.01); *H02K 41/031* (2013.01); *H02K 41/035* (2013.01)

(58) Field of Classification Search
CPC ............... H02K 7/1869; H02K 7/1876; H02K 41/02–41/0358

USPC ................................................ 310/12.01–33
See application file for complete search history.

(56) References Cited

U.S. PATENT DOCUMENTS

| 5,440,183 | A  | * | 8/1995 | Denne ..................... F15B 15/00 |
| | | | | 310/12.26 |
| 2008/0079319 | A1 | * | 4/2008 | Okada ....................... B30B 1/42 |
| | | | | 310/12.22 |
| 2013/0181548 | A1 | * | 7/2013 | Kakiuchi ................. H02K 9/19 |
| | | | | 310/12.29 |
| 2014/0159768 | A1 | * | 6/2014 | Schulz ................... G01R 31/28 |
| | | | | 324/765.01 |

* cited by examiner

*Primary Examiner* — Quyen P Leung
*Assistant Examiner* — Minki Chang
(74) *Attorney, Agent, or Firm* — Craige Thompson; Thompson Patent Law; Vincent Musgrove

(57) ABSTRACT

A linear actuator comprising a first assembly, a second assembly, and a magnetic sensor. The second assembly is linearly movable with respect to the first assembly such that the linear actuator is configured so as to be in one of a plurality of linear positions. The first assembly and the second assembly cooperatively define a magnetic pathway. The magnetic pathway is configured to vary in length with linear movement of the first assembly with respect to the second assembly. The magnetic sensor is configured to output a signal indicative of the magnetic field flux routed via the magnetic pathway.

20 Claims, 4 Drawing Sheets

US 10,444,034 B2

LINEAR ACTUATOR WITH POSITION INDICATOR

CROSS-REFERENCE TO RELATED APPLICATIONS

None.

FIELD OF INVENTION

The subject matter disclosed herein relates to a linear actuator such as a hydraulic cylinder, pneumatic cylinder, mechanical actuator, or electro-mechanical actuator, having a position indicator.

BACKGROUND

Linear actuators, for example, hydraulic cylinders, pneumatic cylinders, mechanical actuators, or electro-mechanical actuators, are used in a variety of settings, for example, in industrial facilities (for example, for use with automated machinery), heavy equipment (for example, construction or agricultural equipment), robotics, and the like.

Generally, such linear actuators are configured to apply a generally unidirectional force between two points via the linear (i.e., longitudinal) extension or contraction of the actuator, more particularly, by the extension of a first actuator component (e.g., a cylinder rod) with respect to a second actuator component (e.g., a cylinder housing) or, alternatively, by the retraction of the first component (e.g., cylinder rod) within the second component (e.g., cylinder housing).

Often, during the operation or use of a linear actuator, it may be desirable to know, precisely and accurately, the length to which the linear actuator is extended or retracted, more particularly, to precisely and accurately know the position of the first component (e.g., cylinder rod) with respect to the second component (e.g., cylinder housing).

Conventional attempts to sense the position of a linear actuator such as a hydraulic cylinder have generally proven ill-suited for many of the environments in which such linear actuators are often used. For instance, many conventional position sensors have proven difficult to install, maintain, or repair; are prone to damage or wear from dirt, rock, or debris; or generally unreliable.

As such, what is needed is a linear actuator, for example, a hydraulic cylinder, having a position sensor that can be easily installed, or even retro-fitted to conventional linear actuators; is easily installed, maintained, and repaired; and/or is well-suited for use in industrial settings where linear actuators (e.g., hydraulic cylinders) are commonly employed.

SUMMARY

Disclosed herein is a linear actuator comprising a first assembly, a second assembly, and a magnetic sensor. The second assembly is linearly movable with respect to the first assembly such that the linear actuator is configured so as to be in one of a plurality of linear positions. The first assembly and the second assembly cooperatively define a magnetic pathway. The magnetic pathway is configured to vary in length with linear movement of the first assembly with respect to the second assembly. The magnetic sensor is configured to output a signal indicative of the magnetic field flux routed via the magnetic pathway.

Further, also disclosed herein is a method of using a linear actuator. The method comprises operating the linear actuator, detecting a magnitude of magnetic field flux routed via the magnetic pathway, and correlating the detected magnitude of magnetic field flux to a linear position of the linear actuator. When operated, a magnetic pathway within the linear actuator varies in length.

Further still, also disclosed herein is a linear actuator comprising a magnetic pathway within the linear actuator and a magnetic sensor. The magnetic pathway is configured to vary in length dependent upon a linear position of the linear actuator. The magnetic sensor is configured to output a signal indicative of the magnetic field flux routed via the magnetic pathway.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

Disclosed herein are various embodiments of linear actuators that are configured to indicate a linear position of the linear actuator. As will be disclosed herein, such a linear actuator may comprise various position indicating componentry as will be disclosed herein, and is generally referred to cumulatively herein as a linear actuator configured for position indication (herein, "LAPI"). In one or more of the embodiments disclosed herein, the LAPI is configured to indicate linear position based upon the magnitude of magnetic field flux routed via a particular magnetic pathway.

Figure 1:
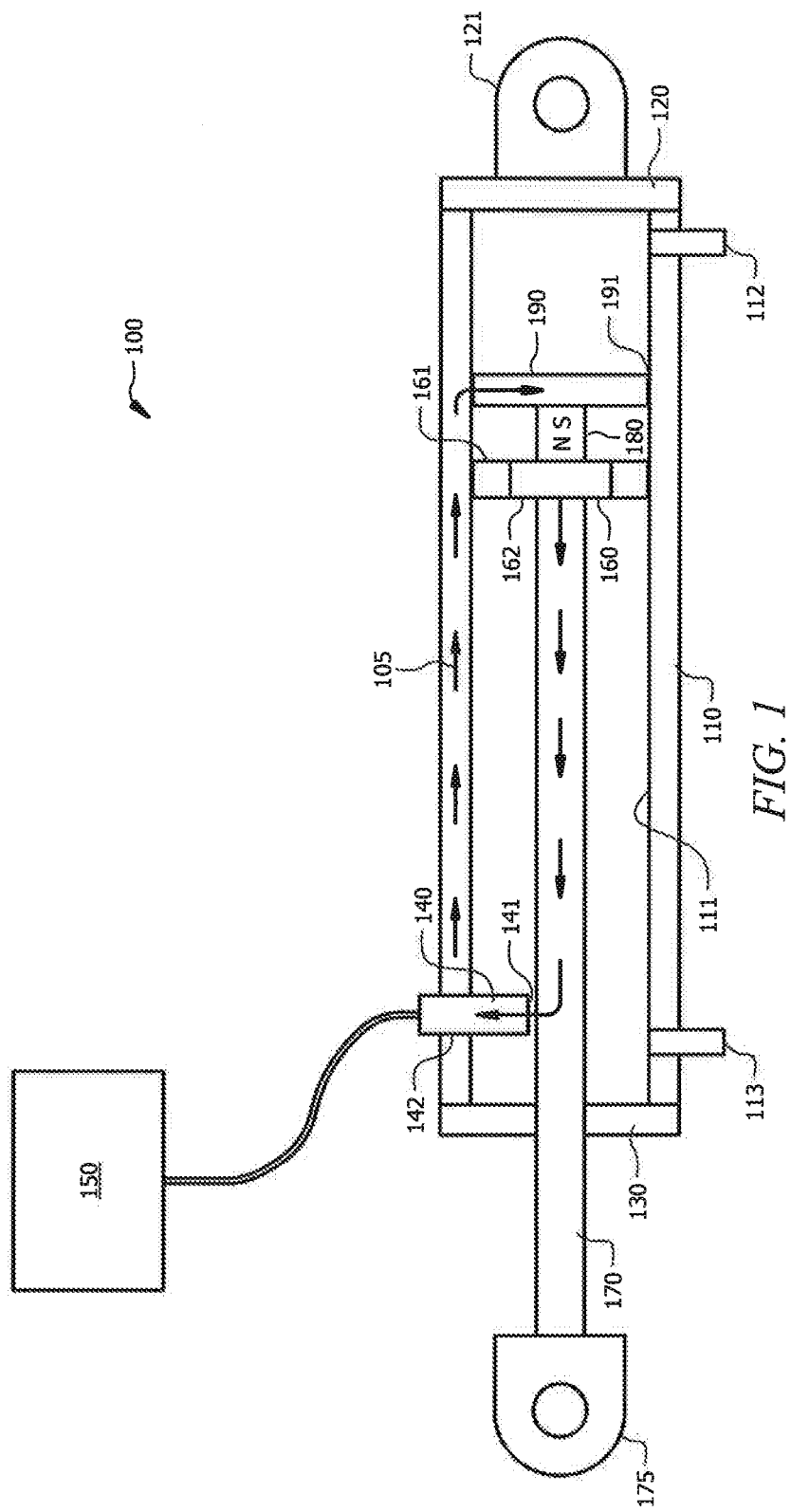
FIG. 1 illustrates a first embodiment of a linear actuator and position sensor.
Figure 2:
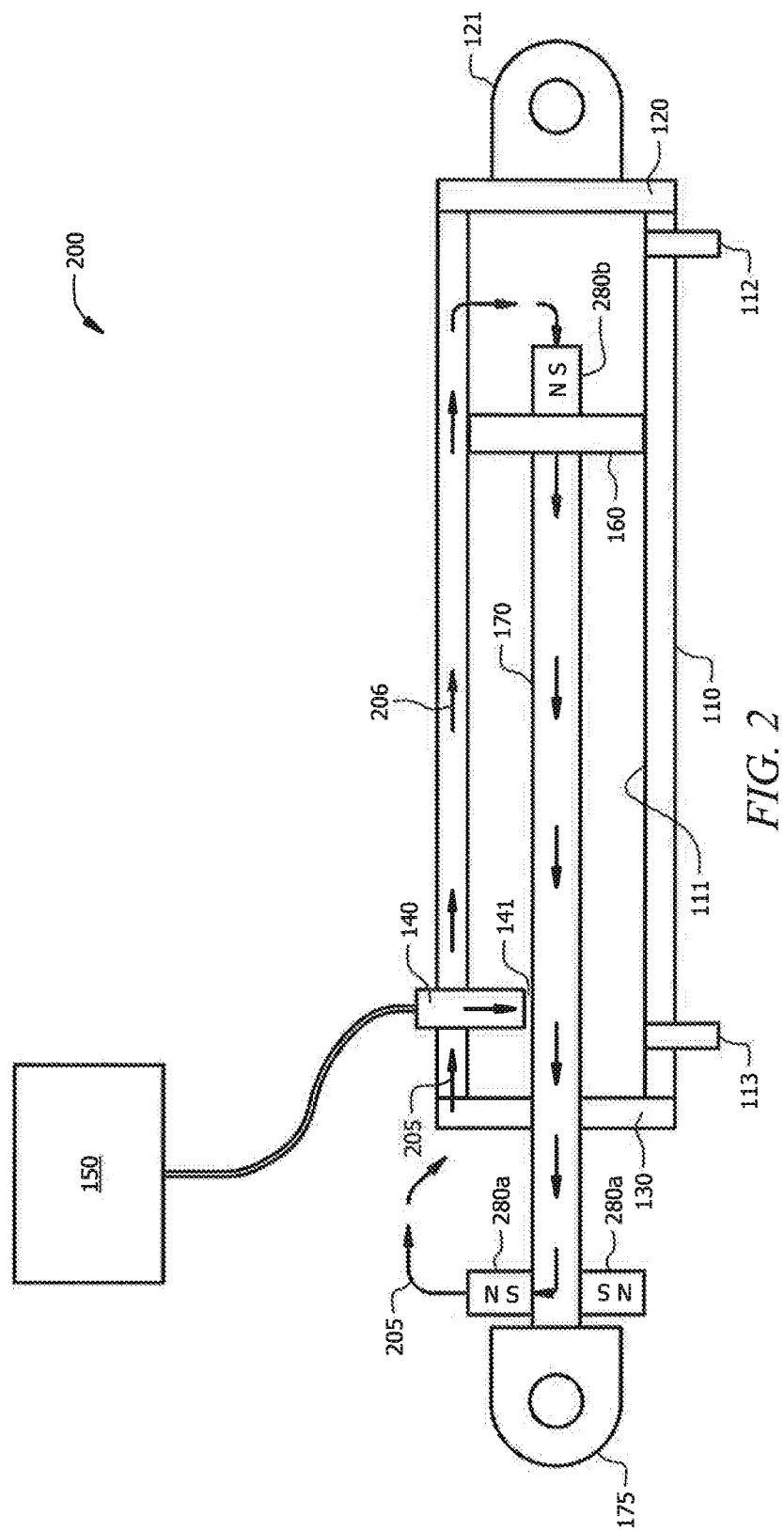
FIG. 2 illustrates a second embodiment of a linear actuator and position sensor.
Figure 3:
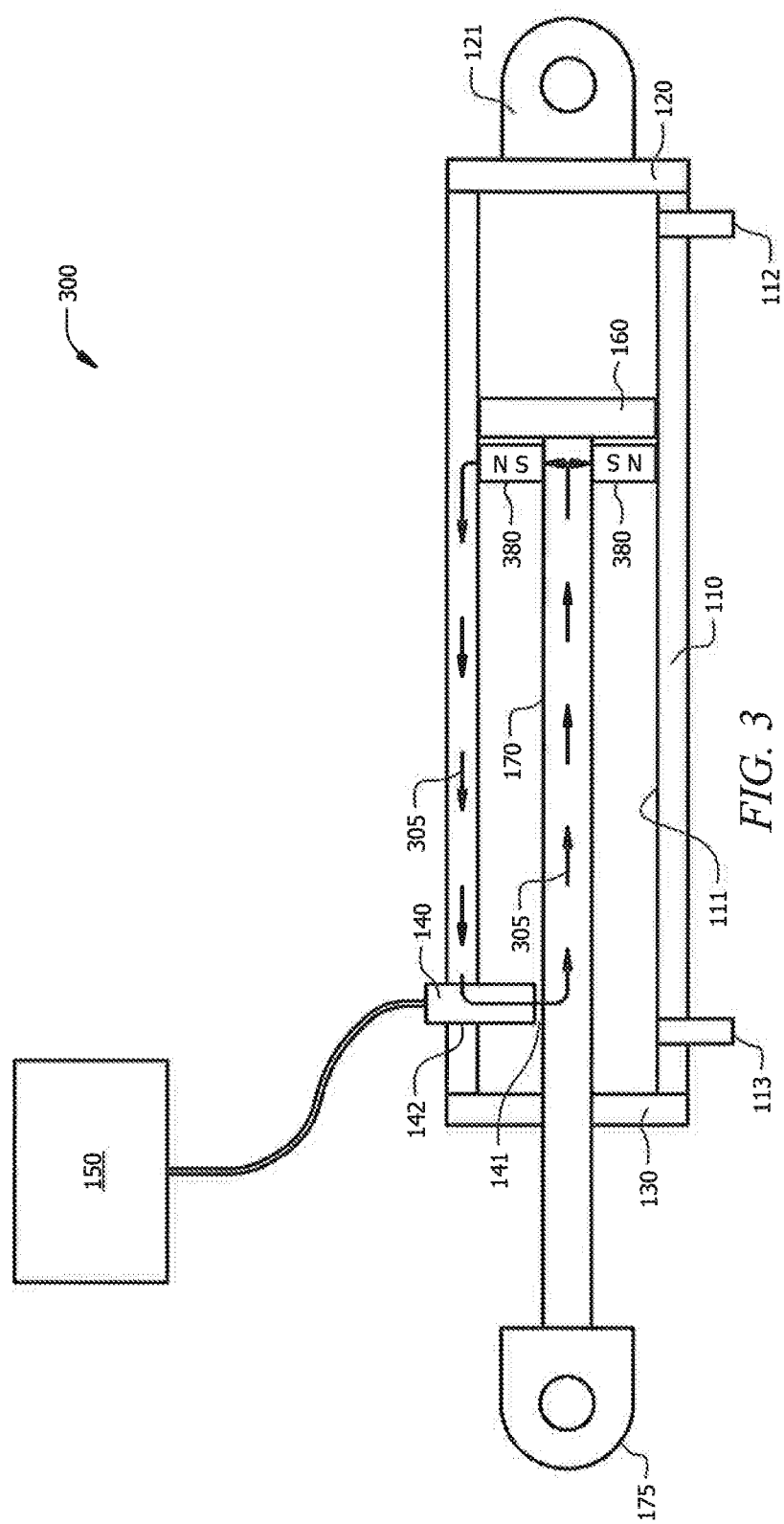
FIG. 3 illustrates a third embodiment of a linear actuator and position sensor.

Referring to the embodiments of FIGS. 1, 2, and 3, the LAPIs are disclosed, referenced, and illustrated as hydraulic cylinders. In other embodiments, the LAPI may similarly take the form of any other suitable type or configuration of linear actuator that, generally speaking, comprises a first component that is linearly movable relative to a second component. For example, the LAPI may take the form of a pneumatic cylinder, a mechanical or electro-mechanical actuator (for example, a screw-type actuator such as a leadscrew or a wheel and axel-type actuator such as a rack and pinion), or other linear motor. As such, the person of ordinary skill in the art, with the aid of this disclosure, will recognize that a LAPI, as will be disclosed herein, may be similarly employed in the context of any suitable linear actuator. Therefore, the person of ordinary skill in the art, with the aid of this disclosure, will recognize that the LAPIs disclosed herein are not limited to implementation in the context of a hydraulic cylinder.

Referring to FIG. 1, a first embodiment of a LAPI 100 is illustrated. As noted above, in the embodiment of FIG. 1, the LAPI 100 comprises and is illustrated in the context of a hydraulic cylinder. The LAPI 100 generally comprises a housing assembly (e.g., a first or stationary assembly) and a rod assembly (e.g., a second or linearly movable assembly). In the embodiment of FIG. 1 where the LAPI 100 comprises a hydraulic cylinder, the housing assembly being configured to receive at least a portion of the rod assembly.

The housing assembly generally comprises a cylinder barrel 110, a cylinder base 120, and a cylinder head 130. The cylinder barrel 110 generally defines a cylindrical bore 111 and is generally configured, cooperatively with the cylinder base 120 and cylinder head 130, to define at least one pressure chamber within the cylinder. For example, the cylinder barrel 110 may comprise a cylindrical or tubular structure. The cylinder barrel includes a first fluid port 112 (e.g., located generally proximate the cylinder base 120) and a second fluid port 113 (e.g., located generally proximate the cylinder head 130). The first and second fluid ports, 112 and 113, are generally configured to provide a route of fluid communication by which a pressurized fluid (e.g., hydraulic fluid) may be introduced into the cylindrical bore 111 defined by the cylinder barrel 110. In an embodiment, the cylinder barrel 120 is formed from a suitable magnetic material (e.g., a material having a relatively high magnetic permeability), for example, ferrous metals.

The cylinder base 120 is generally configured to enclose the pressure chamber at one end (e.g., the end opposite the rod assembly). The cylinder base 120 is attached to the cylinder barrel 110 at an interface via a suitable connection, for example, by welding the cylinder base 120 and cylinder barrel 110, by threading the cylinder base 120 onto the cylinder barrel 110 or vice versa, or by a plurality of bolts and/or tie rods. The interface between the cylinder base 120 and the cylinder barrel 110 may include one or more seals or pressure fittings. Also in the embodiment of FIG. 1, the cylinder base 120 is configured to provide a first attachment point 121 for the LAPI 100, for example, by which the LAPI 100 may be mounted for usage. In the embodiment of FIG. 1, the attachment point 121 comprises a pivot-type mount such as an eyelet or clevis. Alternatively, the attachment point may comprise bushings, pivot pins, trunions, butt plates, or any suitable connection type or component thereof. Alternatively, the LAPI may be side-mounted or flange-mounted.

The cylinder head 130 is generally configured to enclose the pressure chamber at the end of the cylinder barrel 110 opposite the cylinder base 120. The cylinder head 130 may also be configured to receive one or more seals or a seal gland. In such an embodiment, the seals and/or seal gland may be configured to be single or double-acting and may include various suitable materials, for example, elastomeric materials (e.g., nitrile rubber), metallic materials, or ceramic materials. Additionally, the seal and/or seal gland may include a wiper and/or scraper generally configured to remove deposits of moisture, dirt, and debris.

As similarly disclosed with respect to the cylinder base 120, the cylinder head 130 is likewise attached to the cylinder barrel 110 at an interface via a suitable connection, for example, by welding the cylinder head 130 and cylinder barrel 110, by threading the cylinder head 130 onto the cylinder barrel 110 or vice versa, or by a plurality of bolts and/or tie rods. The interface between the cylinder head 130 and the cylinder barrel 110 may likewise include one or more seals or pressure fittings. In an embodiment, the cylinder head 130 is formed from a suitable non-magnetic material (e.g., a high magnetic reluctance material or a material having a relatively low magnetic permeability), for example, ceramics, aluminum, stainless steel, and the like.

In the embodiment of FIG. 1, the cylinder barrel 110 of the LAPI 100 further comprises a magnetic sensor 140 fitted within a sensor port 142 extending through the walls of the cylinder barrel 110 and into the cylindrical bore 111. In the embodiment of FIG. 1, the LAPI 100 includes only a single magnetic sensor 140, that is, only one magnetic sensor and not more than one magnetic sensor 140. In alternative embodiments, an otherwise similar LAPI may comprise two, three, four, five, six, seven, eight, or more magnetic sensors.

The magnetic sensor 140, for example, a transducer, is generally configured to detect magnetic field flux and to output a signal (e.g., a voltage) indicative of the detected magnetic field flux. For instance, in the embodiment of FIG. 1, the magnetic sensor 140 is a Hall-effect sensor although, in alternative embodiments, the magnetic sensor may comprise any sensor that is generally sensitive to magnetic field flux, examples of which include, but are not limited to, anisotropic magneto-resistive (AMR) sensors, giant magneto-resistive (GMR) sensors, and tunneling magneto-resistive (TMR) sensors.

Figure 4:
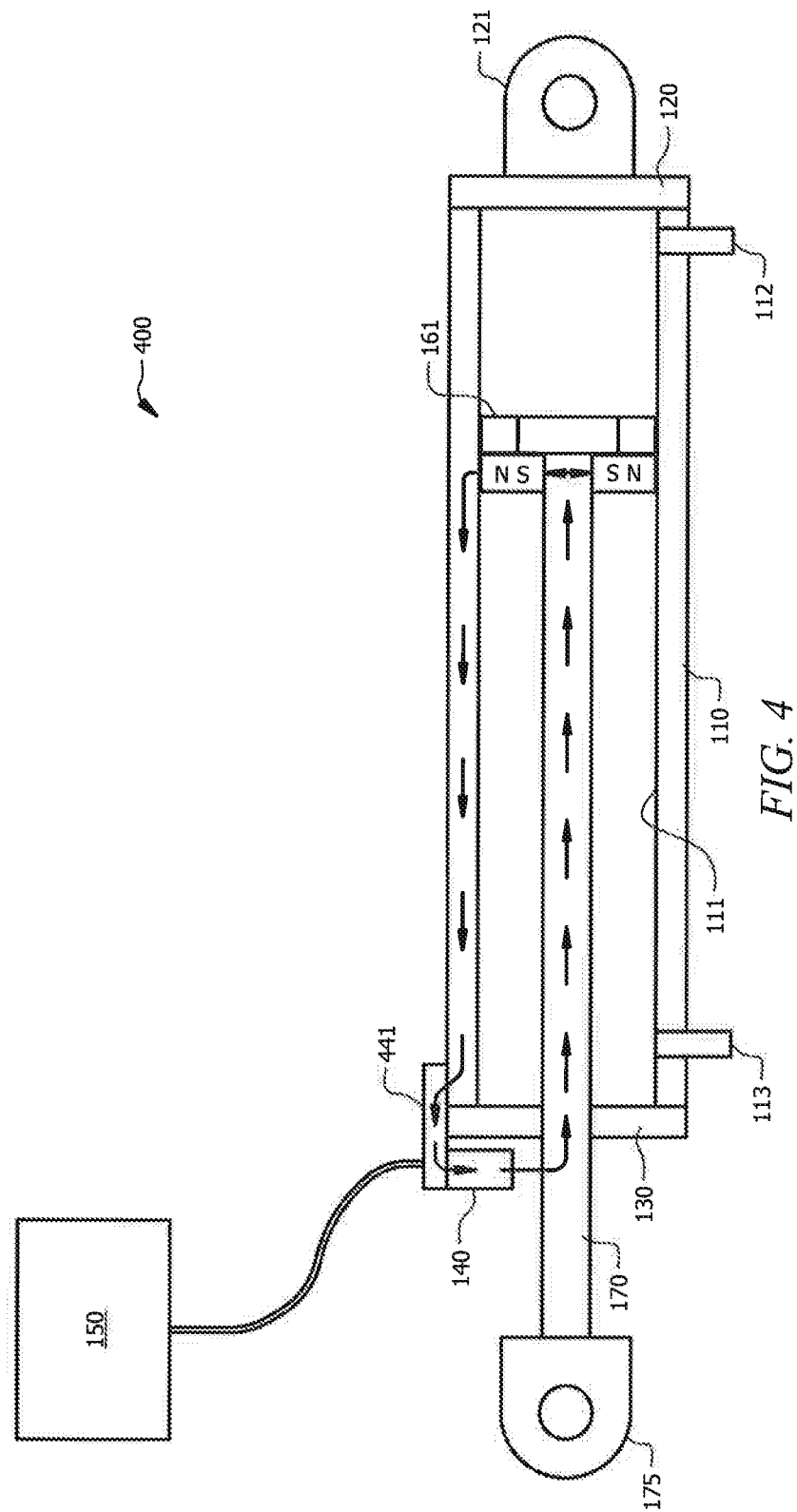
FIG. 4 illustrates a fourth embodiment of a linear actuator and position sensor.

The magnetic sensor 140 is fitted within the sensor port 142 such that, when the rod assembly is positioned with respect to the housing assembly as will be disclosed herein, the magnetic sensor 140 extends suitably close to a rod 170 of the rod assembly, for example, thereby defining a sensor gap 141 between the rod 170 and the magnetic sensor 140. The sensor gap 141 between the rod 170 and the magnetic sensor 140 may be from about 0.1 to about 8 mm, alternatively, from about 0.5 mm to about 4 mm, alternatively, from about 1 mm to about 3 mm. In an alternative embodiment, a magnetic sensor may be located at an alternative position along the cylinder barrel 110, through and/or within the cylinder base 120, or through and/or within the cylinder head 130. Referring to FIG. 4, an alternative embodiment of a LAPI 400 is shown, in which the magnetic sensor 140 is attached externally, for example, via a bracket 441 or the like. Various suitable locations at which a magnetic sensor may be located will be appreciated by a person of ordinary skill in the art with the aid of this disclosure.

Referring again to FIG. 1, the rod assembly generally comprises a piston 160, the rod 170, and a rod-end mounting point 175. The piston 160 is generally configured to fit within the cylinder bore 111 of the cylinder barrel 110, for example, to thereby define at least one pressure chamber. More particularly, the piston 160 may be configured to provide a fluid-tight interface against the interior cylindrical surface of the cylinder bore 111. For example, in various embodiments, the piston 160 may comprise one or more grooves or channels configured to receive seals (e.g., elastomeric or metal seals), bushings, and/or bearing elements. The piston 160 is attached to the rod 170 via a suitable connection, for example, via a threaded interface, a bolted flange, or a nut fastened to the rod (e.g., where a portion of the rod 170 extends through a central bore in the piston 160). In an embodiment, and as will be disclosed herein in further detail, at least a portion of the piston 160 may be formed from a suitable non-magnetic material (e.g., a high magnetic reluctance material or a material having a relatively low magnetic permeability), for example, ceramics, aluminum, stainless steel, and the like. For example, in the embodiment of FIG. 1, the piston 160 includes an inner portion 162 and an annular portion 161 extending about inner portion 162 at the periphery of the piston 160. The annular portion 161 is formed from a non-magnetic material while the inner portion 162 is formed from a magnetic material. In such an embodiment, the non-magnetic annular portion 161 serves to prevent or substantially prevent a magnetic pathway (e.g., circuit) from forming directly between the rod 170 and the cylinder barrel 110. In alternative embodiments, substantially all of the piston may be formed from a non-magnetic material.

The rod 170 is generally configured to be extended from or retracted within the cylinder housing, for example, responsive to movement of the piston 160 within the cylinder barrel 110. The rod 170 is formed from a suitable magnetic material (e.g., a material having a relatively high magnetic permeability), for example, ferrous metals, more particularly, cold-rolled steel.

As shown in FIG. 1, the rod 170 is attached to the rod-end mounting point 175, for example, at the end of the rod 170 opposite the piston 160 and such that, when the rod assembly is positioned within the housing assembly, the rod-end mounting point 175 is generally opposite the attachment point 121 of the cylinder base 120. In the embodiment of FIG. 1, the rod-end mounting point 175 comprises a pivot-type mount, such as an eyelet or clevis. Alternatively, and as similarly noted above, the attachment point may comprise bushings, pivot pins, trunions, butt plates, or any suitable connection type or component thereof.

In the embodiment of FIG. 1, the rod assembly further comprises a magnet 180 and a magnet pole piece 190. In the embodiment of FIG. 1, the magnet 180 is attached to the piston 160 such that a first pole of magnet 180 (e.g., the "north" pole, as illustrated in FIG. 1) forms a magnetic pathway with the inner portion 162 (e.g., the magnetic portion) of the piston 160. The magnet 180 may be attached to the piston 160 via any suitable connection, for example, by way of bolts, a threaded interface, an adhesive (e.g., epoxy), rivets, and the like, which may be used alone or in conjunction with one or more brackets, flanges, mounts, the like, or combinations thereof. In an alternative embodiment, for example, in an embodiment where the piston is formed entirely from a non-magnetic material, the magnet 180 may be coupled to the rod 170. For example, in such an embodiment, the piston may be secured around a portion of the rod 170 (e.g., a seat) such that a portion of the rod 170 extends through a central bore through the piston. In such an alternative embodiment, the magnet 180 forms a magnetic pathway with the rod 170.

Also in the embodiment of FIG. 1, the magnet pole piece 190 is attached to a second, opposite pole of magnet 180 (e.g., the "south" pole, as illustrated in FIG. 1). The magnet pole piece 190 is generally configured to provide a magnetic pathway between the second pole of the magnet 180 and the cylinder barrel 110. The magnet pole piece 190 may comprise any suitable configuration, for example, a plate, one or more rods, or the like, and generally extends outward from the magnet 180 toward an interior cylindrical surface of cylinder barrel 120. In an embodiment, the magnet pole piece 190 may extend suitably close to the interior cylindrical surface of cylinder barrel 120, for example, thereby defining a pole gap 191 between the magnet pole piece 190 and the cylinder barrel 120. The pole gap 191 between the magnet pole piece 190 and the cylinder barrel 120 may be from about 0.1 to about 5 mm, alternatively, from about 0.5 mm to about 4 mm, alternatively, from about 1 mm to about 3 mm. The magnet pole piece 190 is formed from a suitable magnetic material.

In the embodiment of FIG. 1, the magnet 180 is illustrated as positioned such that north pole ("N") of the magnet 180 abuts piston 160 and the south pole ("S") abuts the magnet pole piece 190. In an alternative embodiment, the orientation of the magnet 180 may be reversed, for example, such that the south pole ("S") of the magnet 180 abuts piston 160 and the north pole ("N") abuts the magnet pole piece 190. As will be disclosed herein, either orientation may be suitable with the understanding that the magnetic field flux that will be detected as a result thereof (e.g., the magnetic field flux imparted by the magnet 180) may be reversed.

In the embodiment of FIG. 1, the assembled LAPI 100 (e.g., where the rod assembly (e.g., the second or linearly movable assembly) is positioned with respect to the housing assembly (e.g., the first or stationary assembly)) defines a magnetic pathway (e.g., a magnetic circuit). The magnetic pathway is illustrated by field lines 105 and comprises the magnet 180, the piston 160, the rod 170, the sensor gap 141, the magnetic sensor 140, the cylinder barrel 110, the pole gap 191, the magnet pole piece 190, and again to the magnet 180. While in FIG. 1 the magnetic pathway field lines 105 are illustrated as extending from the north pole ("N") of the magnet 180 to the south pole ("S") of the magnet 180, the illustration of field lines 105 is not intended to limit the structure or implementation of the LAPI 100.

Therefore, the disclosed LAPI 100 results in a closed-loop routing of magnetic flux via the magnetic pathway (e.g., field lines 105). The magnetic sensor 140 detects the magnetic flux that is routed via the magnetic pathway and outputs a signal, more particularly, a voltage that is indicative of the magnitude of the magnetic flux density.

The length of the disclosed magnetic pathway varies with the position of the rod assembly with respect to the housing assembly. More particularly, as the rod assembly contracts into the housing assembly (e.g., the cylinder is shortened), the magnetic pathway length increases and, conversely, as the rod assembly is extended from the housing assembly (e.g., the cylinder is lengthened), the magnetic pathway decreases.

The magnetic flux density varies in magnitude with the length of the magnetic pathway; more particularly, increasing magnetic pathway length corresponds to a decrease in magnetic flux density along the pathway and, correspondingly, decreasing magnetic pathway length corresponds to an increase in magnetic flux density along the pathway.

As such, in the embodiment of FIG. 1, as the rod assembly contracts into the housing assembly (e.g., the cylinder is shortened), thereby increasing the magnetic pathway length, the magnetic flux density detected by the magnetic sensor 140 decreases and the signal (e.g., voltage) output by the magnetic sensor 140 likewise decreases. Likewise, as the rod assembly is extended from the housing assembly (e.g., the cylinder is lengthened), thereby decreasing the magnetic pathway, the magnetic flux density detected by the magnetic sensor 140 increases and the signal (e.g., voltage) output by the magnetic sensor 140 likewise increases.

In an embodiment, the signal (e.g., voltage) generated and output by the magnetic sensor 140 may be supplied to a linear position determination unit (LPDU) 150. The LPDU 150 is generally configured to determine and output a signal indicative of the linear position of the LAPI 100 (e.g., the rod assembly with respect to the housing assembly) based upon the signal (e.g., voltage) indicative of magnetic flux density. In various embodiments, the signal indicative of the linear position of the LAPI 100 may be expressed in terms of the linear position of the LAPI or any correlating parameter. Reference to a correlating parameter is intended to denote any parameter that is related to the linear position of the LAPI 100 such that the parameter varies as a result of the operation of the LAPI 100. As an example, if the LAPI 100 of FIG. 1 were implemented to raise and/or lower the blade of a bulldozer, examples of a correlating parameter might include an indication of blade height and/or depth, for example, expressed as either an actual height or depth or a percentage of an ultimate blade position (e.g., fully raised or fully lowered).

In an embodiment, the LPDU 150 comprises circuitry mounted on a suitable circuit board assembly. In such an embodiment, the circuitry generally includes a plurality of functional modules. In an embodiment, a functional module refers to a hardware component (e.g., an integrated circuit (IC) configured to perform at least one function, for example, an amplifier or a buffer). In some embodiments, the functional module performs multiple functions (e.g., on a single chip). In various embodiments, the functional module comprises a group of components (e.g., transistors, resistors, capacitors, diodes, and/or inductors) on an IC which may perform a defined function. In various embodiments, a functional module includes a specific set of inputs, a specific set of outputs, and/or an interface (e.g., an electrical interface, a logical interface, and/or other interfaces) with other functional modules of the IC and/or with external components.

In an additional or alternative embodiment, the LPDU 150 comprises a processor implemented via one or more central processing unit (CPU) chips, logic units, cores (e.g., as a multi-core processor), field-programmable gate arrays (FPGAs), application specific integrated circuits (ASICs), and digital signal processors (DSPs).

The processor may be in signal communication with a memory that stores instructions causing the processor to implement a method that includes the steps of determining a signal indicative of the linear position of the LAPI 100 (e.g., the rod assembly with respect to the housing assembly) based upon the signal (e.g., voltage) indicative of magnetic flux density and outputting the signal indicative of the linear position of the LAPI 100.

Referring to FIG. 2, a second embodiment of a LAPI 200 is illustrated. In the embodiment of FIG. 2, the LAPI 200 comprises and is illustrated in the context of a hydraulic cylinder, as similarly disclosed with respect to the embodiment of FIG. 1. Like the LAPI 100 disclosed with respect to FIG. 1, the LAPI 200 of FIG. 2 comprises a similarly configured housing assembly comprising a cylinder barrel 110, a cylinder base 120, and a cylinder head 130. The LAPI 200 of FIG. 2 also comprises a similarly configured rod assembly comprising a piston 160, a rod 170, and a rod-end mounting point 175.

In the embodiment of FIG. 2, the rod assembly further comprises a plurality of head-end magnets 280a and a piston-end magnet 280b. While the embodiment of FIG. 2 illustrates two head-end magnets 280a, in various embodiments, three, four, five, six, seven, eight, nine, ten, 11, 12, 13, 14, 15, or more magnets may be similarly positioned about the rod 170, for example, substantially adjacent to and/or abutting the rod-end mounting point 175. As shown in FIG. 2, each of the head-end magnets 280a is attached about the rod 170 such that a first pole of each of the plurality of head-end magnets 280a (e.g., the "south" pole, as illustrated in FIG. 2) forms a magnetic pathway with the rod 170. Also shown in the embodiment of FIG. 2, the piston-end magnet 280b is attached to the piston 160 such that a second pole of the piston-end magnet 280b (e.g., the "north" pole, as illustrated in FIG. 2) forms a magnetic pathway with the piston 160.

In an alternative embodiment, the orientation of each of the plurality of head-end magnets 280a may be reversed, for example, such that the north pole ("N") of each head-end magnet 280a abuts the rod 170 and the south pole ("S") of the piston-end magnet 280b abuts the piston 160 and is generally co-linear and/or co-axial with the rod 170. As will be disclosed herein, either orientation may be suitable with the understanding that the magnetic field flux that will be detected as a result thereof (e.g., the magnetic field flux imparted by the plurality of head-end magnets 280a) may be reversed.

In the embodiment of FIG. 2, the LAPI 200 defines at least one magnetic pathway (e.g., a magnetic circuit). In the embodiment of FIG. 2, a first magnetic pathway is illustrated by field lines 205 and comprises the head-end magnets 280a, the cylinder barrel 110, the magnetic sensor 140, the sensor gap 141, the rod 170, and again to the head-end magnets 280a. While in FIG. 2, the magnetic pathway field lines 205 are illustrated as extending from the north pole ("N") of the head-end magnets 280a to the south pole ("S") of the magnets 280a, the illustration of field lines 205 is not intended to limit the structure or implementation of the LAPI 200.

Therefore, the disclosed LAPI 200 results in a routing of magnetic flux via the magnetic pathway (e.g., field lines 205). The magnetic sensor 140 detects the magnetic flux that is routed via the magnetic pathway and outputs a signal, more particularly, a voltage that is indicative of the magnitude of the magnetic flux density.

Also in the embodiment of FIG. 2, a second magnetic pathway is illustrated by field lines 206 and comprises the piston-end magnet 280b, the piston 160, the rod 170, the sensor gap 141, the magnetic sensor 140, the cylinder barrel 110, and again to the piston-end magnet 280b. Therefore, the disclosed LAPI 200 results in a routing of magnetic flux via the magnetic pathway (e.g., field lines 206). The magnetic sensor 140 similarly detects the magnetic flux that is routed via the magnetic pathway and outputs a signal, more particularly, a voltage that is indicative of the magnitude of the magnetic flux density.

As previously discussed, the length of the disclosed magnetic pathway varies with the position of the rod assembly with respect to the housing assembly. More particularly, as the rod assembly contracts into the housing assembly (e.g., the cylinder is shortened), the first magnetic pathway length decreases and, conversely, as the rod assembly is extended from the housing assembly (e.g., the cylinder is lengthened), the first magnetic pathway increases. Also, as the rod assembly contracts into the housing assembly (e.g., the cylinder is shortened), the second magnetic pathway length increases and, conversely, as the rod assembly is extended from the housing assembly (e.g., the cylinder is lengthened), the second magnetic pathway decreases.

As such, in the embodiment of FIG. 2, as the rod assembly contracts into the housing assembly (e.g., the cylinder is shortened), thereby decreasing the first magnetic pathway length, the magnetic flux density detected by the magnetic sensor 140 increases and the signal (e.g., voltage) output by the magnetic sensor 140 likewise increases. Likewise, as the rod assembly is extended from the housing assembly (e.g., the cylinder is lengthened), thereby increasing the magnetic pathway, the magnetic flux density detected by the magnetic sensor 140 decreases and the signal (e.g., voltage) output by the magnetic sensor 140 likewise decreases.

Also in the embodiment of FIG. 2, the magnetic flux density attributable to the second pathway (e.g., field lines 206) may be lesser than the magnetic flux density attributable to the first pathway (e.g., field lines 205). In such an embodiment, the magnetic flux density attributable to the second pathway (e.g., field lines 206) may be detected, for example, when a change in the magnetic flux density attributable to the first pathway (e.g., field lines 205) is not easily detected, for example, when the first pathway has a relatively greater length.

The signal (e.g., voltage) generated and output by the magnetic sensor 140 may be used to determine and output a signal indicative of the linear position of the LAPI 200 (e.g., the rod assembly with respect to the housing assembly) based upon the signal (e.g., voltage) indicative of magnetic flux density, as similarly discussed with respect to FIG. 1.

Referring to FIG. 3, a third embodiment of a LAPI 300 is illustrated. In the embodiment of FIG. 3, the LAPI 300 comprises and is illustrated in the context of a hydraulic cylinder, as similarly disclosed with respect to the embodiment of FIG. 1. Like the LAPI 100 disclosed with respect to FIG. 1, the LAPI 300 of FIG. 3 comprises a similarly configured housing assembly comprising a cylinder barrel 110, a cylinder base 120, and a cylinder head 130. The LAPI 300 of FIG. 3 also comprises a similarly configured rod assembly comprising a piston 160, a rod 170, and a rod-end mounting point 175.

In the embodiment of FIG. 3, the rod assembly further comprises a plurality of magnets 380. While the embodiment of FIG. 3 illustrates two magnets 380, in various embodiments, three, four, five, six, seven, eight, nine, ten, 11, 12, 13, 14, 15, or more magnets may be similarly positioned about the rod 170, for example, substantially adjacent to and/or abutting the piston 160. As shown in FIG. 3, each of the magnets 380 is attached about the rod 170 such that a first pole of each of the plurality of magnets 380 (e.g., the "south" pole, as illustrated in FIG. 3) forms a magnetic pathway with the rod 170.

In an alternative embodiment, the orientation of each of the plurality of magnets 380 may be reversed, for example, such that the north pole ("N") of each magnet 380 abuts the rod 170. As will be disclosed herein, either orientation may be suitable with the understanding that the magnetic field flux that will be detected as a result thereof (e.g., the magnetic field flux imparted by the magnets 380) may be reversed.

In the embodiment of FIG. 3, the LAPI 300 defines at least one magnetic pathway (e.g., a magnetic circuit). In the embodiment of FIG. 3, the magnetic pathway is illustrated by field lines 305 and comprises the magnets 380, the cylinder barrel 110, the magnetic sensor 140, the sensor gap 141, the rod 170, and again to the magnets 380. While in FIG. 3 the magnetic pathway field lines 305 are illustrated as extending from the north pole ("N") of the magnets 380 to the south pole ("S") of the magnets 380, the illustration of field lines 305 is not intended to limit the structure or implementation of the LAPI 300.

Therefore, the disclosed LAPI 300 results in a routing of magnetic flux via the magnetic pathway (e.g., field lines 305). The magnetic sensor 140 detects the magnetic flux that is routed via the magnetic pathway and outputs a signal, more particularly, a voltage that is indicative of the magnitude of the magnetic flux density.

As previously discussed, the length of the disclosed magnetic pathway varies with the position of the rod assembly with respect to the housing assembly. More particularly, as the rod assembly contracts into the housing assembly (e.g., the cylinder is shortened), the magnetic pathway length increases and, conversely, as the rod assembly is extended from the housing assembly (e.g., the cylinder is lengthened), the magnetic pathway decreases.

As such, in the embodiment of FIG. 3, as the rod assembly contracts into the housing assembly (e.g., the cylinder is shortened), thereby increasing the magnetic pathway length, the magnetic flux density detected by the magnetic sensor 140 decreases and the signal (e.g., voltage) output by magnetic sensor 140 likewise decreases. Likewise, as the rod assembly is extended from the housing assembly (e.g., the cylinder is lengthened), thereby decreasing the magnetic pathway, the magnetic flux density detected by the magnetic sensor 140 increases and the signal (e.g., voltage) output by the magnetic sensor 140 likewise increases.

The signal (e.g., voltage) generated and output by the magnetic sensor 140 may be used to determine and output a signal indicative of the linear position of the LAPI 300 (e.g., the rod assembly with respect to the housing assembly) based upon the signal (e.g., voltage) indicative of magnetic flux density, as similarly discussed with respect to FIG. 1.

Also disclosed herein are methods of employing or using a LAPI of the type disclosed herein, for example, one or more of LAPI 100, LAPI 200, or LAPI 300. In an embodiment, a method of using LAPI generally comprises the steps of operating the LAPI, detecting the magnitude of magnetic field flux routed via a magnetic pathway at a particular magnetic pathway length, and correlating the detected magnitude of magnetic field flux to a linear position of the LAPI or a correlating parameter thereof.

In an embodiment, the LAPI may be operated by using a LAPI in an intended setting. For example, in an example previously referenced herein, a LAPI configured as a hydraulic cylinder may be implemented to raise and/or lower the blade of a bulldozer. In such an example, operating the LAPI may comprise using the LAPI to raise and/or lower the blade of the bulldozer during operation of the bulldozer, for example, via extension and/or contraction of the LAPI (e.g., the hydraulic cylinder). Additional or alternative implementations of various types and configurations of LAPIs will be apparent to the person of ordinary skill in the art with the aid of this disclosure.

At a given point during operation (e.g., while the LAPI is used to raise and/or lower the bulldozer blade), the LAPI may arrive in a first linear position (e.g., where the LAPI has a first length). As disclosed herein, because the length of the disclosed magnetic pathways varies with the length of the LAPI, when the LAPI is in the first linear position, the magnetic pathway (e.g., one of magnetic pathways 105, 205, or 305, as disclosed herein) will have a first magnetic pathway length.

The magnitude of magnetic field flux routed via the magnetic pathway may be detected via the magnetic sensor 140. More particularly, the magnitude of magnetic field flux routed via the magnetic pathway may be detected when the magnetic pathway has the first magnetic pathway length. The magnetic sensor 140, therefore, may output a signal indicative of the magnetic field flux routed via the magnetic pathway at the first pathway length.

The detected magnitude of magnetic field flux may be correlated to a linear position of the LAPI or a correlating parameter thereof. For example, the signal (e.g., voltage) indicative of the magnetic field flux routed via the magnetic pathway at the first pathway length may be output to the LPDU 150 or another suitable determination unit. The LPDU 150 may process the received signal indicative of the magnetic field flux routed via the magnetic pathway at the first pathway length to derive the correlated linear position. The LPDU 150 may output a signal indicative of the linear position of the LAPI or a correlating parameter thereof. For example, in the example where the LAPI comprises a hydraulic cylinder may be implemented to raise and/or lower the blade of a bulldozer, such a signal may be expressed in terms of hydraulic cylinder length, extension, or contraction, expressed as either an actual length or as a percentage of extension or contraction, blade height and/or depth, for example, expressed as either an actual height or depth or a percentage of an ultimate blade position (e.g., fully raised or fully lowered), or combinations thereof.

In an embodiment, a method of employing or using a LAPI may comprise continuing to operate the LAPI, for example, by causing the LAPI to be extended or contracted. During continued operation, the LAPI may arrive in a second linear position (e.g., where the LAPI has a second length). When the LAPI is in the second linear position, the magnetic pathway (e.g., one of magnetic pathways 105, 205, or 305, as disclosed herein) will have a second magnetic pathway length.

The magnitude of magnetic field flux routed via the magnetic pathway may be detected when the magnetic pathway has the second magnetic pathway length. The magnetic field flux detected when the magnetic pathway has a first length will differ from the magnetic field flux when the magnetic pathway has the second length. The magnetic sensor 140 may output a signal indicative of the magnetic field flux routed via the magnetic pathway at the second pathway length that, likewise, differs (e.g., in magnitude) from the signal indicative of the magnetic field flux routed via the magnetic pathway at the first pathway length.

ADDITIONAL EMBODIMENTS

A first embodiment, which is a linear actuator comprising a first assembly; a second assembly, wherein the second assembly is linearly movable with respect to the first assembly such that the linear actuator is configured so as to be in one of a plurality of linear positions, wherein the first assembly and the second assembly cooperatively define a magnetic pathway, wherein the magnetic pathway is configured to vary in length with linear movement of the first assembly with respect to the second assembly; and a magnetic sensor, wherein the magnetic sensor is configured to output a signal indicative of the magnetic field flux routed via the magnetic pathway.

A second embodiment, which is the linear actuator of the first embodiment, wherein the linear actuator comprises a hydraulic cylinder.

A third embodiment, which is the linear actuator of one of the first through the second embodiments, wherein the first assembly comprises a cylinder barrel, a cylinder base, and a cylinder head, and wherein the second assembly comprises a piston, a rod, and a first magnet.

A fourth embodiment, which is the linear actuator of the third embodiment, wherein the second assembly further comprises a magnet pole piece, and wherein the first magnet is positioned between the piston and the magnet pole piece.

A fifth embodiment, which is the linear actuator of the fourth embodiment, wherein the magnetic pathway extends between the first magnet and the rod, between the rod and the magnetic sensor, between the magnetic sensor and the cylinder barrel, between the cylinder barrel and the magnet pole piece, and between the magnet pole piece and the first magnet.

A sixth embodiment, which is the linear actuator of the third embodiment, wherein the second assembly further comprises a second magnet and a third magnet, wherein the first and second magnets are positioned radially about the rod at a position substantially opposite the piston, and wherein the third magnet is positioned adjacent to the piston.

A seventh embodiment, which is the linear actuator of the sixth embodiment, wherein the magnetic pathway extends between the first magnet and the cylinder barrel, between the cylinder barrel and the magnetic sensor, between the magnetic sensor and the rod, and between the rod and the first magnet.

An eighth embodiment, which is the linear actuator of one of the sixth through the seventh embodiments, wherein the north magnetic pole of the first magnet and the north magnetic pole of the second magnet abut the rod and the south magnetic pole of the third magnet abuts the piston, or wherein the south magnetic pole of the first magnet and the north magnetic pole of the second magnet abut the rod and the north magnetic pole of the third magnet abuts the piston.

A ninth embodiment, which is the linear actuator of the third embodiment, wherein the second assembly further comprises a second magnet, and wherein the first and second magnets are positioned radially about the rod at a position substantially adjacent the piston.

A tenth embodiment, which is the linear actuator of the ninth embodiment, wherein the magnetic pathway extends between the first magnet and the rod, between the rod and the magnetic sensor, between the magnetic sensor and the cylinder barrel, and between the cylinder barrel and the first magnet.

An eleventh embodiment, which is the linear actuator of one of the ninth through the tenth embodiments, wherein the north magnetic pole of the first magnet and the north magnetic pole of the second magnet abut the rod, or wherein the south magnetic pole of the first magnet and the north magnetic pole of the second magnet abut the rod.

A twelfth embodiment, which is a method of using a linear actuator, the method comprising operating the linear actuator, wherein, when operated, a magnetic pathway within the linear actuator varies in length; detecting a magnitude of magnetic field flux routed via the magnetic pathway; and correlating the detected magnitude of magnetic field flux to a linear position of the linear actuator.

A thirteenth embodiment, which is the method of the twelfth embodiment, wherein the detected magnitude of magnetic field flux varies with the length of the magnetic pathway.

A fourteenth embodiment, which is the method of one of the twelfth through the thirteenth embodiments, wherein, when the linear actuator is in a first linear position, the magnetic pathway has a first length; wherein, when the magnetic pathway has the first length, a first magnitude of magnetic field flux routed via the magnetic pathway is detected; and wherein the first magnitude of magnetic field flux is correlated to the first linear position.

A fifteenth embodiment, which is the method of the fourteenth embodiment, wherein, when the linear actuator is in a second linear position, the magnetic pathway has a second length; wherein, when the magnetic pathway has the second length, a second magnitude of magnetic field flux routed via the magnetic pathway is detected; and wherein the second magnitude of magnetic field flux is correlated to the second linear position.

A sixteenth embodiment, which is a linear actuator comprising a magnetic pathway within the linear actuator, wherein the magnetic pathway is configured to vary in length dependent upon a linear position of the linear actuator; and a magnetic sensor, wherein the magnetic sensor is configured to output a signal indicative of the magnetic field flux routed via the magnetic pathway.

A seventeenth embodiment, which is the linear actuator of the sixteenth embodiment, wherein, when the linear actuator is in a first linear position, the magnetic pathway has a first length, and wherein, when the magnetic pathway has the first length, a sensor is configured to output a signal indicative of a first magnitude of magnetic field flux routed via the magnetic pathway.

An eighteenth embodiment, which is the linear actuator of the seventeenth embodiment, wherein, when the linear actuator is in a second linear position, the magnetic pathway has a second length, and wherein, when the magnetic pathway has the second length, the sensor is configured to output a signal indicative of a second magnitude of magnetic field flux routed via the magnetic pathway.

A nineteenth embodiment, which is the linear actuator of one of the sixteenth through the eighteenth embodiments, wherein the magnetic sensor is a Hall-effect sensor, an anisotropic magneto-resistive (AMR) sensor, a giant magneto-resistive (GMR) sensor, or a tunneling magneto-resistive (TMR) sensor.

A twentieth embodiment, which is the linear actuator of one of the sixteenth through the nineteenth embodiments, wherein the linear actuator comprises a hydraulic cylinder.

While embodiments of the disclosure have been shown and described, modifications thereof can be made without departing from the spirit and teachings of the invention. The embodiments and examples described herein are exemplary only, and are not intended to be limiting. Many variations and modifications of the invention disclosed herein are possible and are within the scope of the invention.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent . . . 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the detailed description of the present invention. The disclosures of all patents, patent applications, and publications cited herein are hereby incorporated by reference.

What is claimed is:

1. A linear actuator comprising:
   a first assembly;
   a second assembly comprising a longitudinally extending rod and a first magnet, wherein the second assembly is linearly movable with respect to the first assembly such that the linear actuator is configured so as to be in one of a plurality of linear positions, wherein the first assembly and the second assembly cooperatively define a magnetic pathway, and wherein the magnetic pathway is configured to vary in length with linear movement of the first assembly with respect to the second assembly; and
   a magnetic sensor, wherein the magnetic sensor is configured to output a signal indicative of a magnetic field flux routed via the magnetic pathway,
   wherein the magnetic field flux routed via the magnetic pathway is directed in only one direction along the longitudinally extending rod, such that for each relative position between the first assembly and the second assembly, increasing length of the magnetic pathway corresponds to a decrease in magnetic field intensity detected by the magnetic sensor, wherein at least the first magnet is configured to impart the magnetic field flux.

2. The linear actuator of claim 1, wherein the linear actuator comprises a hydraulic cylinder.

3. The linear actuator of claim 2,
   wherein the first assembly comprises a cylinder barrel, a cylinder base, and a cylinder head, and
   wherein the second assembly further comprises a piston and a rod.

4. The linear actuator of claim 3,
   wherein the second assembly further comprises a magnet pole piece, and
   wherein the first magnet is positioned between the piston and the magnet pole piece.

5. The linear actuator of claim 4, wherein the magnetic pathway extends between the first magnet and the rod, between the rod and the magnetic sensor, between the magnetic sensor and the cylinder barrel, between the cylinder barrel and the magnet pole piece, and between the magnet pole piece and the first magnet.

6. The linear actuator of claim 3,
   wherein the second assembly further comprises a second magnet and a third magnet,
   wherein the first and second magnets are positioned radially about the rod at a position substantially opposite the piston, and
   wherein the third magnet is positioned adjacent to the piston.

7. The linear actuator of claim 6, wherein the magnetic pathway extends between the first magnet and the cylinder barrel, between the cylinder barrel and the magnetic sensor, between the magnetic sensor and the rod, and between the rod and the first magnet.

8. The linear actuator of claim 6,
   wherein the north magnetic pole of the first magnet and the north magnetic pole of the second magnet abut the rod and the south magnetic pole of the third magnet abuts the piston, or
   wherein the south magnetic pole of the first magnet and the north magnetic pole of the second magnet abut the rod and the north magnetic pole of the third magnet abuts the piston.

9. The linear actuator of claim 3,
wherein the second assembly further comprises a second magnet, and
wherein the first and second magnets are positioned radially about the rod at a position substantially adjacent the piston.

10. The linear actuator of claim 9, wherein the magnetic pathway extends between the first magnet and the rod, between the rod and the magnetic sensor, between the magnetic sensor and the cylinder barrel, and between the cylinder barrel and the first magnet.

11. The linear actuator of claim 9,
wherein the north magnetic pole of the first magnet and the north magnetic pole of the second magnet abut the rod, or
wherein the south magnetic pole of the first magnet and the north magnetic pole of the second magnet abut the rod.

12. A method of using a linear actuator, the method comprising:
providing for a first assembly comprised in the linear actuator;
providing for a second assembly comprised in the linear actuator and a first magnet, the second assembly comprising a longitudinally extending rod, wherein the second assembly is linearly movable with respect to the first assembly such that the linear actuator is configured so as to be in one of a plurality of linear positions, and wherein the first assembly and the second assembly cooperatively define a magnetic pathway;
operating the linear actuator, wherein, when operated, the magnetic pathway within the linear actuator varies in length with linear movement of the first assembly with respect to the second assembly;
detecting a magnitude of magnetic field flux routed via the magnetic pathway; and
correlating the detected magnitude of the magnetic field flux to a linear position of the linear actuator,
wherein the magnetic field flux routed via the magnetic pathway is directed in only one direction along the longitudinally extending rod, such that for each relative position between the first assembly and the second assembly, increasing length of the magnetic pathway corresponds to a decrease in magnetic field intensity detected by a magnetic sensor, wherein at least the first magnet is configured to impart the magnetic field flux.

13. The method of claim 12, wherein the detected magnitude of magnetic field flux varies with the length of the magnetic pathway.

14. The method of claim 12,
wherein, when the linear actuator is in a first linear position, the magnetic pathway has a first length,
wherein, when the magnetic pathway has the first length, a first magnitude of magnetic field flux routed via the magnetic pathway is detected, and
wherein the first magnitude of magnetic field flux is correlated to the first linear position.

15. The method of claim 14,
wherein, when the linear actuator is in a second linear position, the magnetic pathway has a second length,
wherein, when the magnetic pathway has the second length, a second magnitude of magnetic field flux routed via the magnetic pathway is detected, and
wherein the second magnitude of magnetic field flux is correlated to the second linear position.

16. A linear actuator, comprising:
a first assembly;
a second assembly comprising a longitudinally extending rod and a first magnet, wherein the second assembly is linearly movable with respect to the first assembly such that the linear actuator is configured so as to be in one of a plurality of linear positions, wherein the first assembly and the second assembly cooperatively define a magnetic pathway within the linear actuator, wherein the magnetic pathway is configured to vary in length dependent upon a linear position of the linear actuator; and
a magnetic sensor, wherein the magnetic sensor is configured to output a signal indicative of a magnetic field flux routed via the magnetic pathway,
wherein the magnetic field flux routed via the magnetic pathway is directed in only one direction along the longitudinally extending rod, such that for each linear position of the linear actuator, increasing length of the magnetic pathway corresponds to a decrease in magnetic field intensity detected by the magnetic sensor, wherein at least the first magnet is configured to impart the magnetic field flux.

17. The linear actuator of claim 16,
wherein, when the linear actuator is in a first linear position, the magnetic pathway has a first length, and
wherein, when the magnetic pathway has the first length, a sensor is configured to output a signal indicative of a first magnitude of magnetic field flux routed via the magnetic pathway.

18. The linear actuator of claim 17,
wherein, when the linear actuator is in a second linear position, the magnetic pathway has a second length, and
wherein, when the magnetic pathway has the second length, the sensor is configured to output a signal indicative of a second magnitude of magnetic field flux routed via the magnetic pathway.

19. The linear actuator of claim 16, wherein the magnetic sensor is a Hall-effect sensor, an anisotropic magneto-resistive (AMR) sensor, a giant magneto-resistive (GMR) sensor, or a tunneling magneto-resistive (TMR) sensor.

20. The linear actuator of claim 16, wherein the linear actuator comprises a hydraulic cylinder.

* * * * *